(12) United States Patent
Kunow et al.

(10) Patent No.: US 10,404,053 B2
(45) Date of Patent: Sep. 3, 2019

(54) COMMUNICATION DISTRIBUTION UNIT CONTAINING AT LEAST ONE POWER SWITCH

(71) Applicant: ONESUBSEA IP UK LIMITED, London (GB)

(72) Inventors: Peter Kunow, Berlin (DE); Volker Phielipeit-Spiess, Celle (DE); Aleksander Cywinski, Celle (DE)

(73) Assignee: ONESUBSEA IP UK LIMITED, London (GB)

( * ) Notice: Subject to any disclaimer, the term of this patent is extended or adjusted under 35 U.S.C. 154(b) by 200 days.

(21) Appl. No.: 15/508,730

(22) PCT Filed: Sep. 5, 2015

(86) PCT No.: PCT/IB2015/001626
§ 371 (c)(1),
(2) Date: Mar. 3, 2017

(87) PCT Pub. No.: WO2016/034938
PCT Pub. Date: Mar. 10, 2016

(65) Prior Publication Data
US 2017/0237249 A1    Aug. 17, 2017

(30) Foreign Application Priority Data
Sep. 5, 2014 (EP) .................... 14003066

(51) Int. Cl.
| H02H 5/04 | (2006.01) |
| H02H 3/20 | (2006.01) |
| H02H 3/10 | (2006.01) |
| H02H 7/20 | (2006.01) |
| H02H 7/26 | (2006.01) |

(52) U.S. Cl.
CPC ............... *H02H 3/10* (2013.01); *H02H 3/20* (2013.01); *H02H 5/041* (2013.01); *H02H 7/20* (2013.01); *H02H 7/26* (2013.01); *H01H 2231/044* (2013.01)

(58) Field of Classification Search
CPC .......... H02H 7/06; H01H 51/29; H01H 47/22; F16L 52/005
USPC ......................................... 361/88
See application file for complete search history.

(56) References Cited

U.S. PATENT DOCUMENTS

| 5,834,721 | A | 11/1998 | Ostergaard et al. |
| 7,288,856 | B2 | 10/2007 | Thiery et al. |
| 8,558,550 | B2 | 10/2013 | Bagul |
| 2013/0286547 | A1 | 10/2013 | Andrea et al. |
| 2013/0300491 | A1 | 11/2013 | Ove et al. |

(Continued)

FOREIGN PATENT DOCUMENTS

WO    2012038100 A1    3/2012

OTHER PUBLICATIONS

International Search Report and Written Opinion dated Jan. 7, 2016 for International Application No. PCT/IB2015/001626.

*Primary Examiner* — Dharti H Patel
(74) *Attorney, Agent, or Firm* — Brandon S. Clark

(57) ABSTRACT

A communication distribution unit, containing at least one power switch, said communication distribution unit comprising for an at least one consumer a power switch (4) based on a semiconductor design to switch on and off output lines (3) for the at least one consumer and the power switch (4) comprises at least one switching module (5).

17 Claims, 5 Drawing Sheets

(56) References Cited

U.S. PATENT DOCUMENTS

Figure 1:
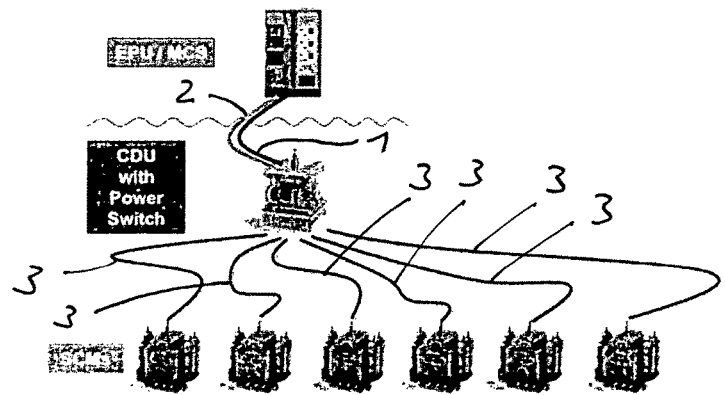

2014/0093247 A1* 4/2014 Jamtveit .................. F16L 1/12
398/104
2017/0155233 A1* 6/2017 Aarskog ............. E21B 33/0355

* cited by examiner

COMMUNICATION DISTRIBUTION UNIT CONTAINING AT LEAST ONE POWER SWITCH

The invention relates to a communication distribution unit containing at least one power switch, in particular one subsea power switch, which combines two main functionalities, switching and fuse function.

Failures of power supply and electrical distribution equipment are a major concern for operators. The cost to retrieve and repair system components increases dramatically. Failures might result in loss of production jeopardizing the availability of production systems. System availability is one of the key success criteria during the lifetime of the field of use. A major area of focus is electrical failures of equipment. Loss of production and high cost of intervention motivate operators and service companies to seek technologies which will reduce the probability of failure and maximize overall system availability.

Power switches are used, for example, in the production of natural gas and mineral oil. In this respect the power switch is incorporated into a subsea control system.

The electrical distribution system is a backbone of modern subsea production systems. Uninterrupted transmission of power and communication signals is a necessary condition for effective operation. To ensure efficient operation and highest availability of a subsea production system the design process of electrical system should start early in the field development phase with the selection of right field architecture through equipment specification and finally design. This will ensure that the electrical system will be able to fulfil evolving requirements of the field throughout its lifetime. From the project economics point of view the value of technology can be measured either by its ability to increase revenues or decrease costs. The inclusion of a Subsea power switch will provide an upside to both.

The impact of electrical failures ranges from minor and gradual degradations which can be tolerated by the system to catastrophic failures resulting in loss of production and incurred intervention costs. Typically the failures occur in umbilical assemblies, distribution systems, subsea control modules, electrical flying leads, connectors and terminations. There are two general types of failures: intrinsic and extrinsic. Intrinsic faults are related to design, materials and assembly; extrinsic faults are related to handling, installation, environment, mechanical stressing and misapplication (Williams & Bruce, 2001, *Subsea Electrical Failures: BP Experience and Lessons Learned*. s.I., Society of Underwater Technology).

TABLE 1

Types of electrical failures, source (Williams & Bruce, 2001)

| Intrinsic Failures | Extrinsic Failures |
|---|---|
| Shuttle pin assembly seal failure | Poor termination workmanship |
| Inadequate material selection | Poor soldering workmanship |
| Inadequate adhesion to connector parts | Incorrect boot seals applies |
| | Damaged/split boot seals |
| Material incompatibility | Missing sealing parts within connectors |
| Fracturing of electrical pin inserts | Calcareous and/or marine deposit around compensation and pin shrouds |
| | Shuttle pin connector movement failure |

In order to minimize the impact of electrical failures subsea key recommendations have been made.
1) Remote Isolation of Faults
2) Advanced System Diagnostics
3) Fault Finding Capability Known from U.S. Pat. No. 8,558,550 and EP 2 333 570 is a method to monitor an electrical power switching module of an underwater installation and a power distribution unit for an underwater installation. The purpose is to determine whether the power switching modules are functioning correctly, or to diagnose a power switching module failure.

Known from U.S. Pat. No. 5,834,721 and GB 2,334,388 is a coupling and switching system for subsea electrical power distribution. This prior art relates to a coupling and switching system having one or several through-going electrical conductors, substantially for subsea connection of a single or multiphase high voltage system.

Known from EP 2 567 391 and US 2013300491 WO 2012/038237 is a semiconductor power switch with decoupling device, specifically for subsea use. Transistors, thyristors, triacs or other semiconductor devices can be used as switching devices. Earth fault detection is also a subject of the improvement. Load current sensor, memory for storing activation parameters are adressed.

Known from US 2013286547 is a subsea electrical distribution system having a redundant circuit breaker control and disclosing method for providing same. The system and method are used for coupling electrical power subsea. The system comprises a subsea electrical distribution system having at least one modular circuit breaker assembly. The modular circuit breaker assembly is controlled by a control system that has a plurality of circuit breaker controls.

In some embodiments of the present proposal it is proposed to provide a switch that combines The switch combines electronics and software design enabling automatic and independent isolation of electrical faults. In embodiments incorporated into a subsea control system, the power switch might automatically shut off faulty subsea consumers without interruption to adjacent wells powered from the same source. Providing continuous monitoring of individual subsea consumers the power switch might gives the operator flexibility and advanced warnings about the status of the equipment. The power switch might give the operator the ability to continue production from a field affected by multiple critical electrical failures.

According to embodiments the power switch might provide protection of subsea assets from electrical failures (like shortages or insulation loss) without impact to adjacent consumers, for example wells, and ability to switch on and off subsea consumers (SCMs) on demand.

Advantageous might be:
Ability to switch both AC and DC currents this is an intrinsic function resulting from the design and/or
Cable integrity check prior to "load cable" mode and/or
Controlled infield umbilical charge during field startup and/or
Automatic isolation of faulty subsea consumers (typically SCMs) during normal operation (Ultra-fast release time, for example <1 µs) and/or
dual isolation point might be added so the device could be operated by divers.

The proposal is explained in more detail with reference to the embodiments illustrated in the accompanying figures.

Figure 2:
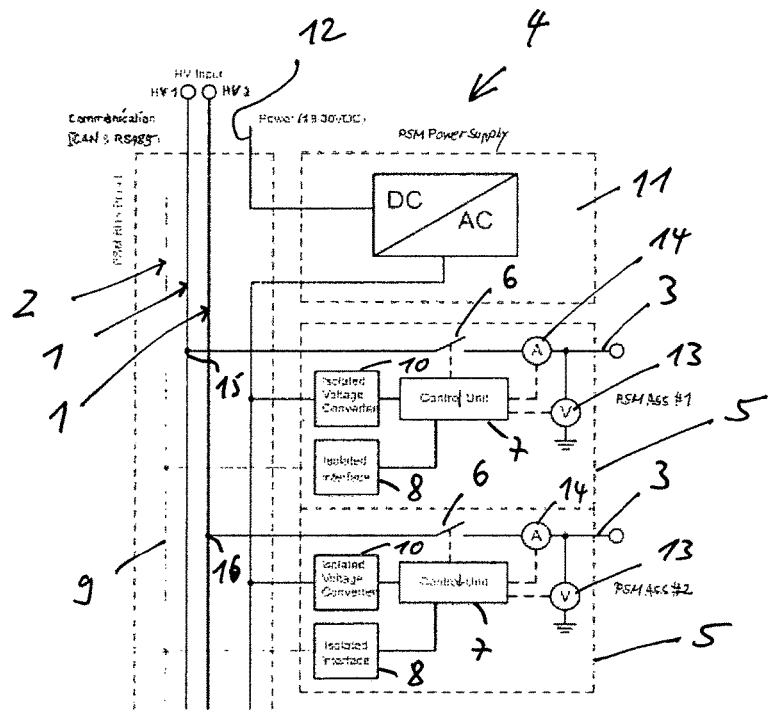
Figure 3:
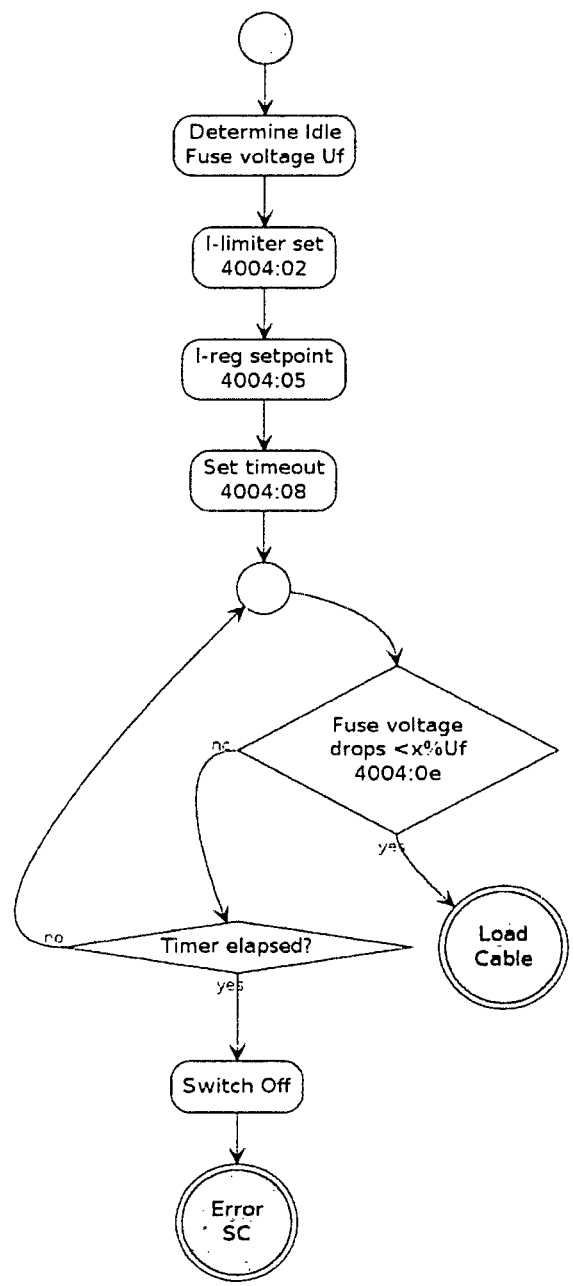
Figure 4:
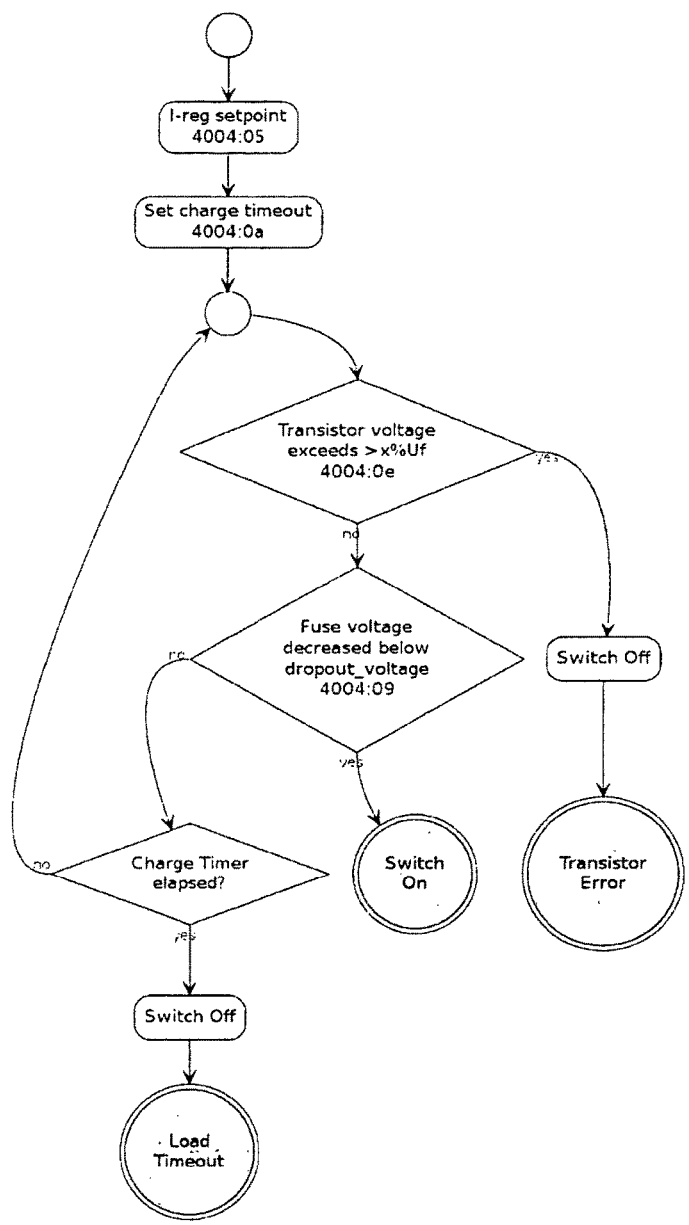
Figure 5:
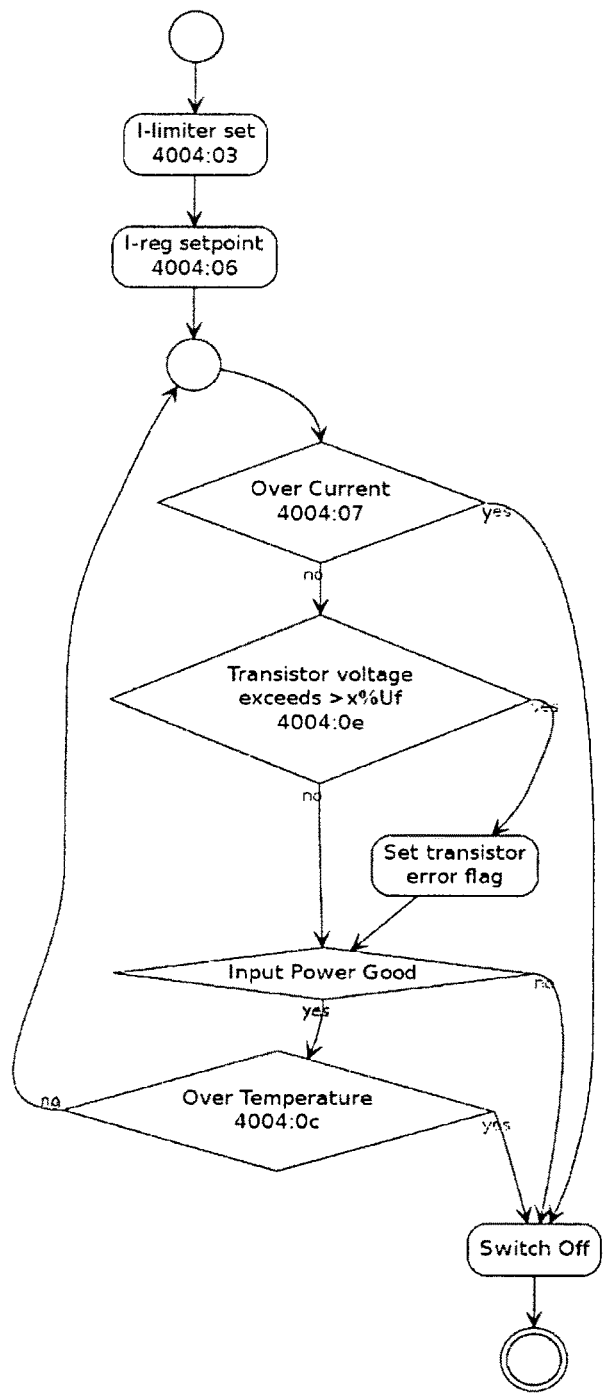
Figure 6:
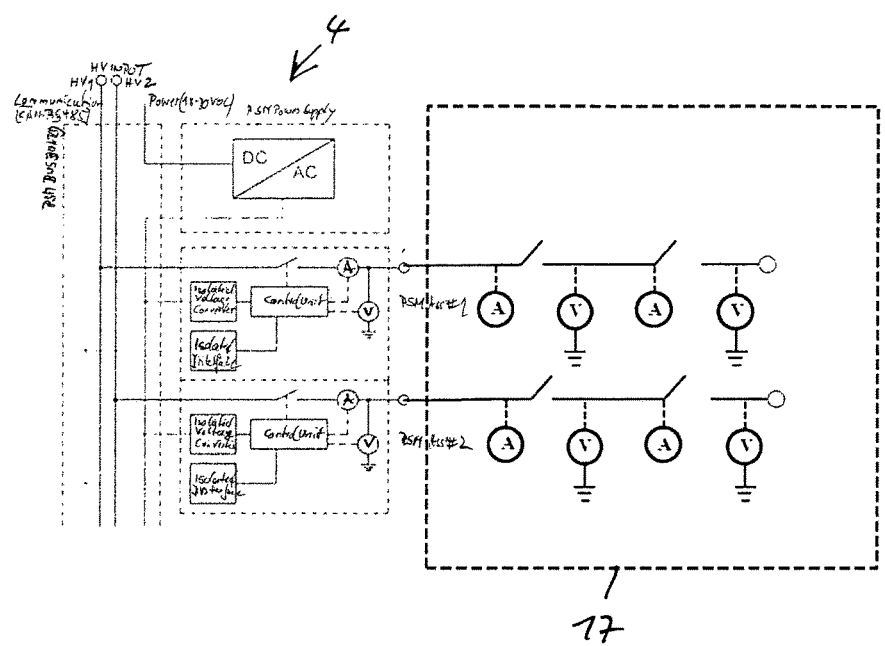

FIG. 1 schematically shows a subsea control system with a master control station (MCS) and an electric power unit (EPU) above sea level and a subsea communication distribution unit (CDU) with power switch connected to individual subsea control modules (SCMs), FIG. 2 schematically shows a power switch design in accordance with the present proposal, FIG. 3 is a flow chart showing a cable integrity check process, FIG. 4 is a flow chart to control infield umbilical charge during field startup, FIG. 5 is a flow chart showing an automatic isolation during operation, FIG. 6 schematically shows a power switch design with galvanic isolation.

In embodiments of the present proposal the power switch is incorporated into a subsea control system as shown in FIG. 1. The control system can consist of two subsystems topside and subsea. Main parts of the topside equipment are the Master Control Station (MCS) and the Electric Power Unit (EPU). The MCS controls the subsea operations such as valve operations and displays system conditions, which can be provided by the subsea installed instrumentation. The EPU can provide the necessary electrical power to supply the subsea equipment. Power and communication cables 1, 2, 3 are connected to a Communication Distribution Unit (CDU). The CDU distributes power and communication signals to individual SCMs. The CDU comprises a Subsea Electronic Module (SEM). The power switch assemblies can be installed inside the SEM.

The power switch 4 shown in FIG. 2 is based on a semiconductor design and is designed to switch on and off individual power lines 3. Advantageously the design of the power switch 4 is based on a MOSFET semiconductor design, for example on a highly efficient silicon carbide MOSFET semiconductor device. In embodiments for subsea use the power switch 4 can be incorporated into the CDU with minimum design changes to existing designs.

The power switch 4 is capable of switching both AC and DC currents. The power switch 4 switches both (supply and return) lines 3 delivering power to a given power consumer for example a Subsea Control Module (SCM). Current, voltage and temperature data are available to confirm and/or verify state of the switch.

The power switch 4 comprises advantageously at least two electrical power switching modules 5 connected respectively between the input 1 and the output 3 and being operable to switch AC or DC power in use. A power switching module 5 comprises a semiconductor switch 6 to switch on and off an individual power line 3. Advantageously the semiconductor device is a MOSFET semiconductor device. In a MOSFET semiconductor switch the resistance of a semiconducting layer is controlled electrostatically. To control the semiconductor switch 6 the power switching module 5 comprises a control unit 7. The control unit 7 can communicate via an isolated interface 8 with a bus 9. The bus 9 provides a communication path between the isolated interface 8 and the master control station (MCS).

The control unit 7 is connected via an isolated voltage converter 10 to a power switching module power supply 11. Advantageously there is a low voltage power input 12 (18-30 VDC) for the power switching module power supply 11.

The control unit 7 of the power switching module 5 can measure voltage (V) and current (A) delivered to a individual electrical subsea control module (SCM) via an individual output line 3. For this purpose a voltage measuring device 13 and a current measuring device 14 can be used.

A power switching module 5 as described above switches a supply or return line 3 to a given power consumer in this case a SCM. A supply line 3 and a return line 3 are provided and for each of the both lines a power switching module 5 as described above is used. The supply and return lines 3 are connected to one of the two input lines 1 at connection points 15, 16. For each consumer, for example a SCM, powered from the same communication distribution unit (CDU) both supply and return lines 3 having different connections points 15, 16 are used. The number of consumers is selectable.

The power switching modules can be controlled by a software and with the configuration described above the power switching modules 5 can offer the following main functionality:

Automatic isolation of faults without disturbance to adjacent channels

Independent control (on/off) of power consumers subsea

Condition monitoring

FIG. 3 is a flow chart for a cable integrity check prior to "load cable" mode. The flow chart of FIG. 3 shows the cable integrity process. A current limit is set to a low value of, for example, 15 mA. If the fuse voltage does not drop below the set-point within a predefined time than the "load cable process" will not be initiated because this indicates a shortage of the connected cable/consumer.

In an embodiment the semiconductor switch 6 of each power switching module 5 is a semiconductor device which based on its controllable resistance can allow to set low value currents in addition to an on/off-function. The semiconductor device can allow to provide a fuse voltage.

FIG. 4 is a flow chart for controlled (programmable current limitation) infield umbilical charge during field startup. During uncontrolled field startup the umbilical cable capacitance can cause high inrush currents. Due to a programmable current limitation (typical 100 mA) the Subsea Switch offers a controlled field start. Both limit of max current as well as it's profile (time function) can be configured via software.

FIG. 5 is a flow chart for automatic isolation of faulty subsea consumers (typically SCMs) during normal operation (Ultra-fast release time <1 µs) The flow chart shows the "fuse ON state" process. The current and voltage measurement runs very fast hence in case of a deviation to the set points (current, voltage or temperature) the switch will be opened in less than <1 µs.

FIG. 6 shows a subsea power switch capable of DC and AC currents with for example a dual galvanic isolation point 17 for the supply and return lines 3 of an individual SCM. As the device uses semiconductor switch there is no galvanic isolation between the source and the consumer. This means that leakage current can be still flowing in the circuit. As this is poses no issues with ROV operable field it cannot be used by divers when dual galvanic isolation is required. Therefore dual galvanic isolation part is included. Each of the terminals is connected to two galvanic isolating devices i. e software or hardware controllable relays, etc. Current and voltage measurement provides redundant information about the status of the device (power on/off) so it's state is verified before unplugged by a diver.

The remote isolation of faults can increase system availability and prevent propagation of faults into the system.

One of the benefits of the power switch 4 is the automatic fuse functionality. The power switch 4 can monitor independently power lines 3 (both, supply and return lines) connected to each of the consumers i.e. SCMs. In case of electrical failure (for example a short circuit on one of the output lines 3) the faulty line 3 is isolated without affecting adjacent consumers powered from the same CDU. This prevents faults from propagating to the entire system and remaining SCMs sustain their redundant power supply (both supply and return lines are available to the consumers). The reduction of redundancy is only limited to the affected consumer, which can only use return line 3. Any further critical failures to return line 3 of will result in full isolation of the consumer without impact to adjacent channels. Furthermore the isolation can take place in less than 1 µs which reduces potential damage to affected hardware. This short reaction time is considerable faster when compared with traditional switches still being used in the industry.

The necessity to switch off power to one or a group of SCMs can be inherent in most subsea interventions; well work overs, equipment replacement/repair, electric inspections, drill center extensions, to name just a few. It is a time consuming and risky activity requiring concerted effort of many involved parties. Therefore simplification of the process and reduction of time needed to perform this task might bring tangible benefits to the operators. This might be vital in deep water environment.

In an embodiment the subsea power switch 4 can be implemented for up to 12 SCMs connected to a single CDU. During its operation the power switch 4 measures voltage and current delivered to each individual SCM. This allows monitoring of the system in real time and verifying its performance and integrity at minimal cost and effort. Long term monitoring and trending can then be used for predictive maintenance planning. Especially when linked with data acquisition and condition monitoring systems like FRIEND™ it adds advanced diagnostics capability and visibility of integrity of electrical distribution down to a single SCM.

Automatic isolation of faults without disturbance to adjacent channels and independent control of power consumer's subsea can have significant impact on RAMEX cost by reduction of intervention time, system downtime and improvement in system availability.

A Subsea Power Switch can be a relatively simple and inexpensive subcomponent of a subsea control system which can increase system availability and reduce exposure to risks during the life of a production field. The switching capability can be used from a production start up through production extensions, interventions, and fault finding to decommissioning while continuous condition monitoring of electrical distribution gives visibility of system integrity and early warnings of potential future issues. Automatic isolation of faults can help to increase system availability and prevents propagation of failures into the system especially during late phases of production life, for example field life.

Although the preceding description has been described herein with reference to particular means, materials and embodiments, it is not intended to be limited to the particulars disclosed herein; rather, it extends to all functionally equivalent structures, methods and uses, such as are within the scope of the appended claims.

The invention claimed is:

1. A system for subsea communication, comprising:
a communication distribution unit (CDU) operatively connected with a plurality of subsea power consumers by a plurality of output lines, the CDU having a power switch comprising a plurality of switching modules, the power switch being coupled with the plurality of output lines to switch on and off communication with individual subsea power consumers by switching on and off communication to the corresponding output line of the plurality of output lines, wherein each switching module comprises a semiconductor switch, wherein each semiconductor switch comprises a metal-oxide-semiconductor field effect transistor (MOSFET) switch.

2. The system as recited in claim 1, wherein the power switch comprises a control unit to control each semiconductor switch, the control unit communicating via an isolated interface coupled with a bus.

3. The system as recited in claim 2, further comprising an electric power unit (EPU) and a master control station (MCS), the bus providing a communication path between the isolated interface and both the EPU and MCS.

4. The system as recited in claim 1, wherein at least two switching modules are software controlled to provide a fuse function.

5. The system as recited in claim 1, wherein at least two switching modules are software controlled to monitor outputs over the corresponding output lines of the plurality of output lines.

6. The system as recited in claim 1, wherein at least two switching modules are software controlled to automatically isolate electrical faults.

7. The system as recited in claim 6, wherein the automatic isolation of electrical faults is performed in less than 1 µs.

8. The system as recited in claim 1, wherein the power switch switches both AC and DC currents.

9. The system as recited in claim 1, wherein the plurality of subsea consumers comprises a plurality of individual subsea control modules.

10. A system, comprising:
a communication distribution unit (CDU) having at least one subsea power switch comprising at least one semiconductor switching module connected with at least one output line to communicate electrical power and data to at least one subsea power consumer; and further comprising an electric power unit (EPU) and a master control station (MCS) at a surface location and coupled with the CDU via communication cables routed subsea.

11. The system as recited in claim 10, wherein the at least one semiconductor switching module comprises a plurality of MOSFET switching modules.

12. The system as recited in claim 10, wherein the at least one subsea power switch comprises a control unit coupled with an isolated interface and a bus, the control unit controlling the at least one semiconductor switching module.

13. The system as recited in claim 12, wherein the bus provides a communication path between the isolated interface and the EPU.

14. The system as recited in claim 10, wherein the subsea power switch switches both AC and DC currents.

15. A method, comprising:
providing a communication distribution unit (CDU) with a power switch having a plurality of semiconductor-based switching modules;
deploying the CDU to a subsea location;
coupling the power switch to a plurality of subsea power consumers via a plurality of communication lines; and
switching power on and off with respect to the individual subsea power consumers of the plurality of subsea power consumers via automatic operation of individual semiconductor-based switching modules of the plurality of semiconductor-based switching modules, wherein switching comprises using the subsea power switch to switch both AC and DC currents.

16. The method as recited in claim 15, further comprising using the CDU to monitor at least one of voltage and current output through the plurality of communication lines.

17. The method as recited in claim 15, further comprising using the CDU to automatically isolate electrical faults.

* * * * *